US 6,696,883 B1

(12) United States Patent
Wilson

(10) Patent No.: US 6,696,883 B1
(45) Date of Patent: Feb. 24, 2004

(54) NEGATIVE BIAS CHARGE PUMP

(75) Inventor: James E. Wilson, Maple Valley, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/665,968

(22) Filed: Sep. 20, 2000

(51) Int. Cl.[7] .................................................. G05F 3/02
(52) U.S. Cl. ....................................................... 327/536
(58) Field of Search ................................ 327/534, 536; 363/59

(56) References Cited

U.S. PATENT DOCUMENTS

| | | | | |
|---|---|---|---|---|
| 5,489,870 A | * | 2/1996 | Arakawa ..................... 327/337 |
| 5,856,918 A | * | 1/1999 | Soneda et al. ................. 363/60 |
| 6,016,073 A | * | 1/2000 | Ghilardelli et al. .......... 327/536 |
| 6,023,188 A | * | 2/2000 | Lee et al. ..................... 327/536 |
| 6,064,251 A | * | 5/2000 | Park ............................. 327/536 |
| 6,100,557 A | * | 8/2000 | Hung et al. .................. 327/299 |
| 6,130,574 A | * | 10/2000 | Bloch et al. ................. 327/536 |
| 6,154,088 A | * | 11/2000 | Chevallier et al. .......... 327/536 |
| 6,175,264 B1 | * | 1/2001 | Jinbo .......................... 327/536 |
| 6,198,342 B1 | * | 3/2001 | Kawai ......................... 327/536 |
| 6,297,974 B1 | * | 10/2001 | Ganesan et al. .............. 363/60 |
| 6,359,947 B1 | * | 3/2002 | Rao ............................. 375/374 |
| 6,373,324 B2 | * | 4/2002 | Li et al. ....................... 327/536 |

* cited by examiner

Primary Examiner—Terry D. Cunningham
(74) Attorney, Agent, or Firm—Christopher P. Maiorana, P.C.

(57) ABSTRACT

The present invention concerns an apparatus generally comprising a plurality of pump stages each implemented on an independent well. The plurality of pump stages may each be configured to generate an output voltage. The plurality of pump stages may be serially connected such that a body bias voltage input of one stage is received from the output voltage of a previous stage.

20 Claims, 4 Drawing Sheets

NEGATIVE BIAS CHARGE PUMP

FIELD OF THE INVENTION

The present invention relates to a method and/or architecture for implementing a charge pump generally and, more particularly, to a method and/or architecture for implementing a negative bias charge pump.

BACKGROUND OF THE INVENTION

A charge pump circuit can generate a high voltage pump output from a single input. Multiple charge pump circuits can be implemented serially to provide increasing voltages. Conventional negative charge pump circuits are built from a clock and capacitor circuit. Ideally, the serially implemented negative charge pump circuits can provide a −(VDD−Vth) increase at each output for a GND to +VDD voltage potential. However, conventional charge pump circuits implement a single substrate (i.e., a single well) for multiple charge pump circuits. The source node voltage is degraded by increasing Vth which is caused by the increased body bias. As subsequent charge pump circuits are added, the source node voltage is degraded due to increasing body bias voltage. Since conventional negative charge pump circuits have high body bias voltage, the output voltage is limited. Additionally, negative charge pump circuits are limited by the technology in which they are implemented. For example, one could not implement a positive charge pump with a P-type substrate and without a twin well process.

Conventional charge pump circuits implement multiple stages in a single substrate. The bulks of each of the transistors within the stages acquire a large body bias voltage. Additionally, for each consecutive stage, a higher body bias voltage builds. For example, a source node can be at approximately −2VDD, while a ground node may have −2.5 volts of body bias voltage. The body bias voltage can degrade a threshold voltage of the conventional charge pump circuits. The body bias voltage can degrade voltage level of a charge pump output. The body bias voltages cause diminishing returns of conventional charge pump circuits. Conventional charge pump circuits can require ten or more stages to provide the desired return. The absolute negative voltage capable of being generating by conventional charge pump circuits is limited by body bias voltage.

SUMMARY OF THE INVENTION

The present invention concerns an apparatus generally comprising a plurality of pump stages each implemented on an independent well. The plurality of pump stages may each be configured to generate an output voltage. The plurality of pump stages may be serially connected such that a body bias voltage input of one stage is received from the output voltage of a previous stage.

The objects, features and advantages of the present invention include providing a method and/or architecture for implementing a negative bias charge pump that may (i) provide increasing levels of negative output voltage, (ii) allow a relatively large negative output voltage to be developed from a smaller negative bias voltage and/or (iii) implement an independent well for each negative charge pump circuit.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
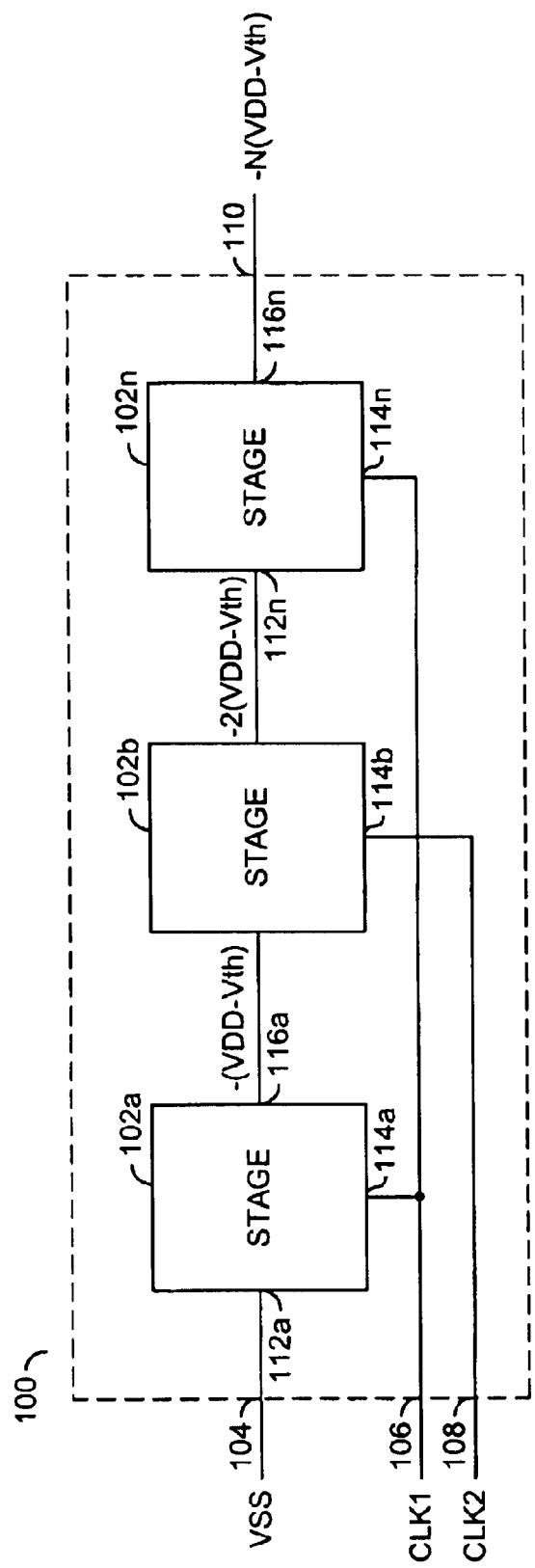
FIG. 1 is a block diagram of a preferred embodiment of the present invention.

Referring to FIG. 1, a block diagram of a circuit 100 is shown in accordance with a preferred embodiment of the present invention. The circuit 100 may provide increasing levels of negative output voltage. The circuit 100 may allow a negative charge pump circuit to generate a relatively large negative output voltage from a smaller negative bias voltage. However, the circuit 100 may require an initialization circuit (to be described in more detail in connection with FIG. 4).

The circuit 100 generally comprises a number of charge pumps (or stages) 102a–102n. In one example, the stages 102a–102n may be implemented as negative bias charge pump circuits. Each of the stages 102a–102n may be implemented with an independent substrate (e.g., an independent well). However, another appropriate number of stages may be implemented in a substrate in order to meet the criteria of a particular implementation. For example, a number of stages may be implemented in a first substrate and another number of stages may be implemented in a second substrate. However, a minimized number of stages implemented per substrate may provide improved reduced body bias voltage. The circuit 100 may have an input 104 that may receive a signal (e.g., VSS), an input 106 that may receive a number of clock signals (e.g., CLK1), an input 108 that may receive a number of clock signals (e.g., CLK2) and an output 110 that may present a signal (e.g., −N(VDD−Vth), where Vth is a mos threshold voltage and N is an integer equal to the number of stages). In one example, the signal −N(VDD−Vth) may be implemented as an output voltage that may be generated in response to the signal VSS. The signals −N(VDD−Vth) and VSS may be implemented as a voltage on a node, a voltage level, or other appropriate input/output signal in order to meet the criteria of a particular implementation.

The stage 102a may have an input 112a that may receive a voltage (e.g., the signal VSS), an input 114a that may receive a clock signal (e.g., the signal CLK1) and an output 116a that may generate an output voltage (e.g., −(VDD−Vth)). The remaining stages 102b–102n may have similar inputs and outputs. For example, the stage 102b may have an input 112b that may receive the signal −(VDD−Vth), an input 114b that may receive the clock signal CLK2 and an output 116b that may generate a voltage (e.g., −2(VDD−Vth)). The stage 102n may have an input 112n that may receive the signal −2(VDD−Vth), an input 114n that may receive the clock signal CLK1 and an output that may generate the voltage −N(VDD−Vth).

The circuit 100 may implement each of the charge pump circuits 102a–102n on electrically separate substrates (e.g., separate wells). However, more than one stage 102a–102n may be implemented on a single substrate. The circuit 100 may allow the charge pump circuits 102a–102n to utilize the output voltage of a previous charge pump circuit as a bias voltage (e.g., well bias voltage) for a succeeding charge pump circuit. For example, the charge pump circuit 102a may provide the output voltage −(VDD−Vth) that may be presented to the charge pump circuit 102b. Ideally, each succeeding stage 102a–102n may have an output voltage equal to an output voltage of the previous stage 102a–102n plus the bias voltage (e.g., –(VDD–Vth). For example, if the bias voltage –(VDD–Vth) is –3 volts, an ideal circuit with six charge pump stages 102a–102n may generate a –18 volt output.

Figure 2:
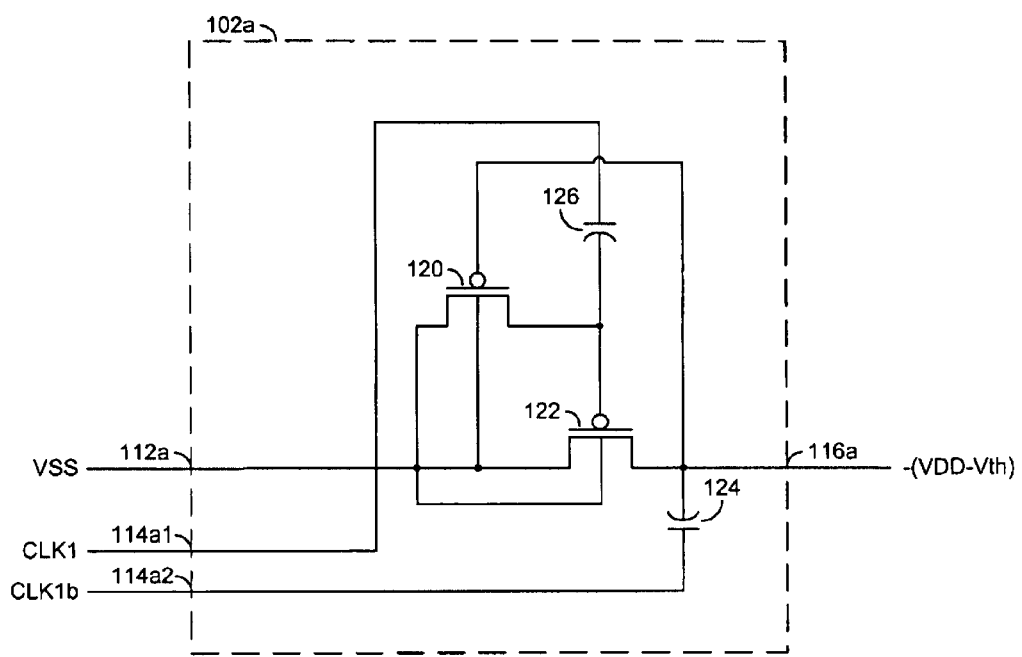
FIG. 2 is a detailed block diagram of the present invention.

Referring to FIG. 2, a detailed schematic of the stage 102a is shown. Each of the stages 102b–102n may have a similar implementation as the stage 102a. The charge pump 102a may be implemented on an electrically independent substrate (e.g., an independent well) from the other stages 102b–102n. The stage 102a generally comprises a transistor 120, a transistor 122, a capacitor 124 and a capacitor 126. The stage 102a generally comprising the input 112a, the input 114a1, the input 114a2 and the output 116a. The input 112a may receive the voltage VSS, the input 114a1 may receive the clock signal CLK1. The input 114a2 may receive the clock signal CLK1b and the output 116a may present the signal –(VDD–Vth). In one example, the clock signal CLK1b may be implemented as a complement of the clock signal CLK1. The clock signal CLK1 and the clock signal CLK1b may be implemented as non-overlapping clock signals. For example, the clock signals CLK1 and CLK1b may active and/or non-active portions at the same time (e.g., inverted, but no skew).

The signal CLK1 may be presented to a first side of the capacitor 126. A second side of the capacitor 126 may be coupled to a source of the transistor 120 and a gate of the transistor 122. A bulk of the transistor 120 and a bulk of the transistor 122 may be coupled to the node VSS. Additionally, a drain of the transistor 120 and a drain of the transistor 122 may be coupled to the node VSS. The complement clock signal CLK1b may be presented to a first side of the capacitor 124. A second side of the capacitor 124 may be coupled to a gate of the transistor 120, the node –VDD and a source of the transistor 122.

Each of the transistors 120 and 122 may be implemented in an independent well. The transistors 120 and 122 may be implemented in a single, double or triple well process substrate. However, each stage 102a–102n may be required to have a unique bias voltage. Each of the stages 102a–102n may implement an output of the previous stage to bias the bulk of the next stage. The circuit 100 may tie the bias voltage to the source voltage of a next stage, to reduce body bias voltage to the source.

Figure 3:
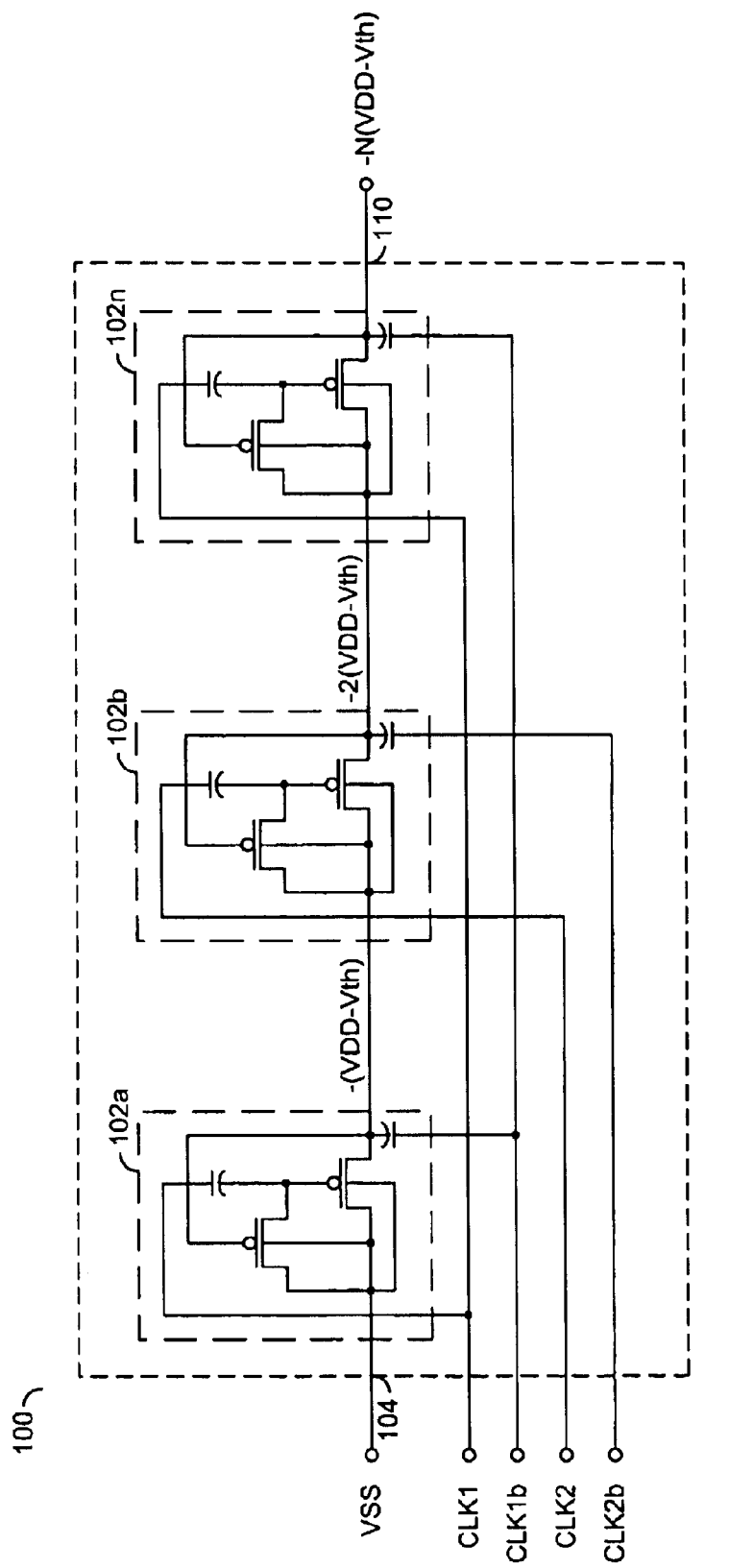
FIG. 3 is a detailed overview of the present invention.

Referring to FIG. 3, a detailed schematic of the circuit 100 is shown. The circuit 100 may implement an output voltage of a previous charge pump circuit (e.g., –(VDD–Vth)) from the stage 102a) as an input bias voltage for a succeeding charge pump circuit (e.g., the stage 102b). For example, the charge pump 102b may receive the bias voltage –(VDD–Vth) as an input from the charge pump 102a. Similarly, the charge pump circuit 102n may receive the bias voltage –2(VDD–Vth) as an input for the charge pump 102b.

Figure 4:
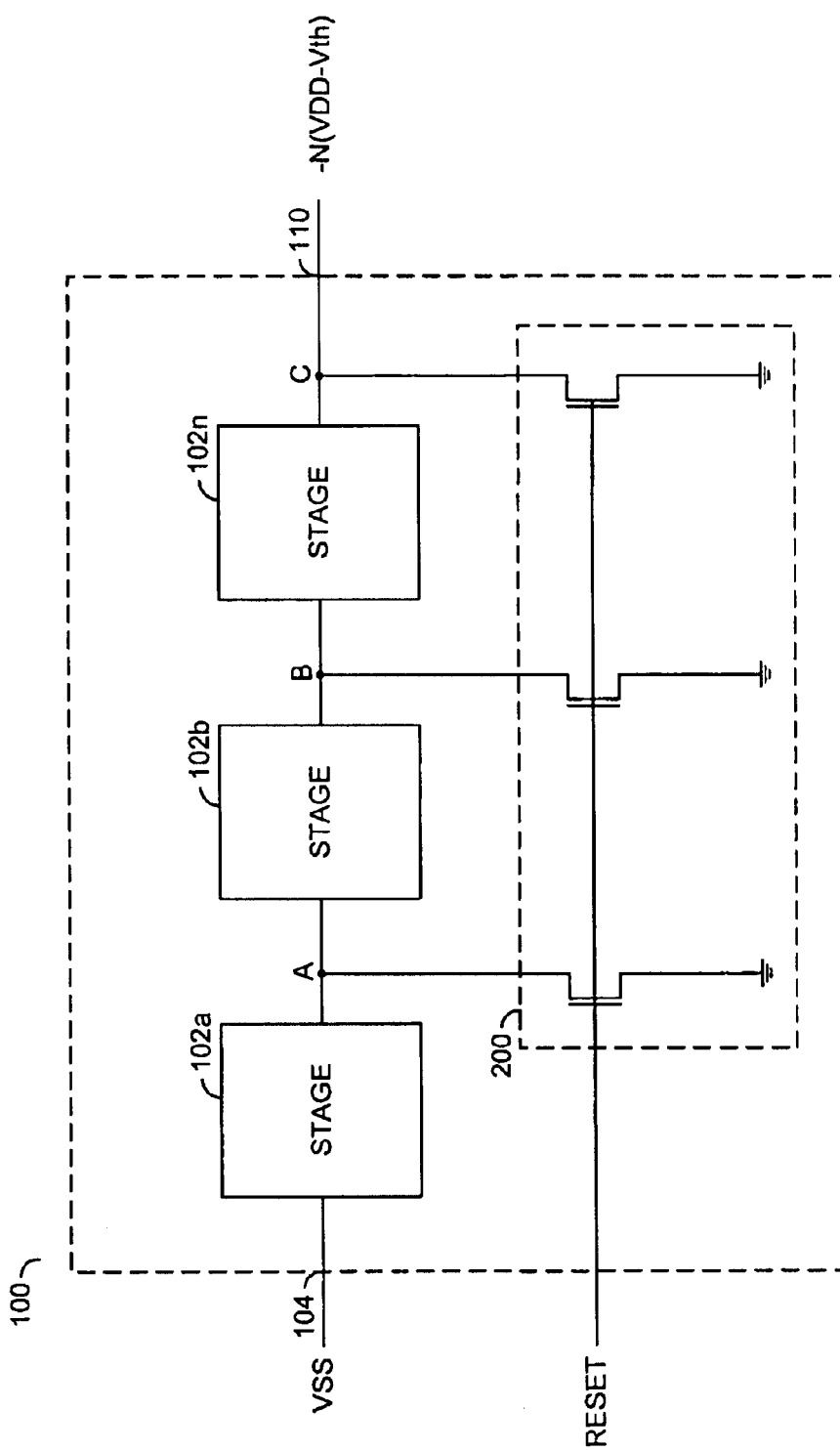
FIG. 4 is a detailed block diagram of an initialization circuit incorporated with the present invention.

Referring to FIG. 4, a block diagram of the circuit 100 implemented with an initialization circuit 200 is shown. The initialization circuit 200 may receive a signal (e.g., RESET). The signal RESET may control the initialization circuit 200. Additionally, the initialization circuit 200 may be coupled to a number of output nodes of the stages 102a–102n (e.g., A, B and C). The initialization circuit 200 may be initialized in response to the signal RESET.

An assertion (e.g., high or "1") on the signal RESET may bring a potential of the nodes A, B and C to ground. The signal RESET may initialize each well of the stages 102a–102n to ground. However, when the signal RESET is de-asserted (e.g., low or "0") the potential on the nodes A, B and C may be driven by each respective stage 102a–102n.

The various signals are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

Conventional charge pump circuits may have diminishing returns on a pumped voltage output due to increasing body bias voltage. For example, a conventional implementation of six charge pump stages with an internal bias voltage of –3 volts may have approximately a –10 volt output instead of an ideal –18 volt output. The circuit 100 may provide an improved negative bias voltage charge pump circuit that may have an increased return over conventional approaches. For example, the circuit 100 with a bias voltage of –3V and six stages may have an output in the range of –15V to –16V.

The negative charge pump stages 102a–102n may implement the clock signals CLK1 and CLK2 and the capacitors 124a–124n and 126a–126n to generate an increased negative voltage. The particular clocking phases of the clock signals CLK1 and CLK2 may allow the circuit 100 to generate a negative voltage at the output node –N(VDD–Vth). A particular negative output voltage may be determined by a particular number of implemented stages 102a–102n. For example, a single negative charge pump with a GND to –(VDD–Vth) potential may generate an output voltage level that may be twice that of –(VDD–Vth).

Each stage 102a–102n may be implemented with an independent well. Since the circuit 100 may not have negative voltages on a single substrate, the stages 102a–102n may implement an output of the previous stage to bias the bulk of the next stage. The circuit 100 may tie the bias voltage to the source voltage of a next stage, to reduce body bias voltage to the source.

The circuit 100 may be implemented for a number of specific applications. For example, to generate a –20 volt output, a –15 volt output or similar negative voltage with a 3 volt supply is nearly impossible with conventional charge pumps. The circuit 100 may allow such voltage generation. Additionally, conventional charge pump circuits may generate up to 100 millivolts of body bias voltage effect from each successive stage and may require 20 or 30 more stages than the charge pump circuit 100 to generate a comparable negative voltage.

The circuit 100 may implement a negative charge pump design that may provide an independent well for each stage. The circuit 100 may allow the bias voltage of each succeeding negative charge pump circuit to be the output voltage of the previous negative charge pump circuit.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a plurality of pump stages configured to generate a negative output voltage, wherein said plurality of pump stages are serially connected and each of said pump stages comprises:
   a first transistor having (i) a first source and a first drain coupled between an input and an output and (ii) a first bulk directly coupled to said input;

a second transistor having (i) a second source and a second drain coupled between said input and a first gate of said first transistor, (ii) a second gate coupled to said output and (iii) and a second bulk directly coupled to said input; and a plurality of third transistors each coupled between a corresponding one of said outputs and a ground.

2. The apparatus according to claim 1, wherein each of said plurality of pump stages comprise:

a first capacitor coupled to said first gate and configured to receive a clock signal; and a second capacitor coupled to said second gate and configured to receive a complement of said clock signal.

3. The apparatus according to claim 1, wherein said apparatus is implemented using a single well process.

4. The apparatus according to claim 1, wherein a first of said plurality of pump stages is configured to receive a supply voltage at said input.

5. The apparatus according to claim 4, wherein a last of said plurality of pump stages is configured to present said negative output voltage up to −20 volts.

6. The apparatus according to claim 4, wherein said negative output voltage comprises a voltage level greater in magnitude than at said input of said first pump stage.

7. The apparatus according to claim 1, wherein said plurality of pump stages are controlled in response to one or more clock signals.

8. The apparatus according to claim 1, wherein a second at least one of said plurality of pump stages are controlled in response to a first signal and a complement to said firts clock signal.

9. The apparatus according to claim 8, wherein a second at least one of said plurality of pump stages are controlled in response to a second clock signal and a complement to said second clock signal.

10. The apparatus according to claim 1, wherein said plurality of third transistor are controlled by a reset signal.

11. The apparatus according to claim 1, wherein said apparatus is implemented using a double well process.

12. An apparatus comprising:

means a plurality of pump stages, wherein said plurality of pump stages are serially connected respectively and a last of said pump stages is configured to generate a negative output voltage;

means for coupling said an input voltage received at an input for each of said pump stages directly to a well for each of said pump stages;

means for first switching coupled between said input and an output in each of said pump stages responsive to a voltage applied to a first gate of said means for first switching;

means for second switching coupled between said input and said first gate in each of said pump stages responsive to an output voltage at said output applied to a second gate of said means for second switching; and means for third switching coupled between said outputs and a ground.

13. A method for generating a negative output voltage comprising the steps of:

A) clocking a plurality of pump stages, wherein said plurality of pump stages are serially connected and a last of said pump stages is configured to generate said negative output voltage;

B) coupling an input voltage received at an input for each of said pump stages directly to a well for each of said pump stages;

C) switching a first transistor coupled between said input and an output in each of said pump stages in response to a voltage applied to a first gate of said first transistor;

D) switching a second transistor coupled between said input and said first gate in each of said pump stages in response to an output voltage at said output applied to a second gate of said second transistor; and E) switching a plurality of third transistor coupled between said outputs and a ground.

14. The method according to claim 13, wherein said negative output voltage is up to −20 volts.

15. The method according to claim 13, wherein a first of said pump stages is configured to receive a supply voltage at said input.

16. The method according to claim 15, wherein said negative output voltage comprises a negative voltage level of greater magnitude than at said input of said first pump stage.

17. The method according to claim 13, wherein step A) further comprises clocking said plurality of pump stages in response to one or more clock signals.

18. The method according to claim 13, wherein step A) further comprises clocking a first at least one of said plurality of pump stages in response to a first clock signal and a complement to said first clock signal.

19. The method according to claim 18, wherein step A) further comprises clocking a second at least one of said plurality of pump stages in response to a second clock signal and a complement to said second clock signal.

20. The method according to claim 13, further comprising the step of:

controlling said plurality of third transistor with a reset signal.

* * * * *